United States Patent

Grove et al.

Patent Number: 6,047,945
Date of Patent: Apr. 11, 2000

[54] ELECTROMAGNETIC VALVE CONSTRUCTION

[75] Inventors: Horst Grove, Bohmewer; Jan-Peter Obenbrugge, Konrad-Adenduer; Ralf Hiddessen, Hasendamm; Franz Rieck, Drossecsh, all of Germany

[73] Assignee: Nass Magnet GmbH, Hannover, Germany

[21] Appl. No.: 08/976,563

[22] Filed: Nov. 24, 1997

[30] Foreign Application Priority Data

Nov. 27, 1996 [DE] Germany .................. 196 49 225

[51] Int. Cl.⁷ .................................................. F16K 31/02
[52] U.S. Cl. .................. 251/68; 251/70; 251/129.06; 251/129.15; 310/330
[58] Field of Search .................. 251/11, 68, 129.01, 251/129.06, 89.5, 129.15; 310/328, 330, 331, 332

[56] References Cited

U.S. PATENT DOCUMENTS

| | | | |
|---|---|---|---|
| 2,258,811 | 10/1941 | Ray | 251/68 |
| 2,910,079 | 10/1959 | Beeghly | 251/68 |
| 3,239,162 | 3/1966 | Engstrom | 251/11 |
| 3,403,238 | 9/1968 | Buechler et al. | 251/11 |
| 4,052,136 | 10/1977 | Ulricksen | 251/68 |
| 4,284,235 | 8/1981 | Diermayer et al. | 251/11 |
| 4,437,644 | 3/1984 | Wilmers | 251/11 |
| 4,494,727 | 1/1985 | Babitzka et al. | 251/129.06 |
| 4,678,727 | 7/1987 | Kushida | 251/129.06 |
| 4,779,839 | 10/1988 | Sears | 251/68 |
| 4,836,496 | 6/1989 | Abujudom et al. | 251/11 |
| 5,318,271 | 6/1994 | Frisch | 251/129.06 |
| 5,593,134 | 1/1997 | Steber et al. | 251/129.06 |

FOREIGN PATENT DOCUMENTS

| | | | |
|---|---|---|---|
| 228980 | 1/1963 | Australia | 251/11 |
| 1000203 | 11/1949 | France | 251/11 |
| 490996 | 5/1975 | U.S.S.R. | 251/11 |

*Primary Examiner*—George L. Walton
*Attorney, Agent, or Firm*—Reising, Ethington, Barnes, Kisselle, Learman & McCulloch, P.C.

[57] ABSTRACT

The invention relates to an electromagnetic valve having a passage therethrough and a closure member which is reciprocable between first and second positions in whoch the passage is openend and closed. An electromagnectic controllable actuator effects movement of the closure member against a spring force from the first position into the second position. The valve includes a retainer which retains the closure member in the second position. The retainer is formed by a piezoelectric bending element which locks the closure member positively in the second position.

17 Claims, 4 Drawing Sheets

ELECTROMAGNETIC VALVE CONSTRUCTION

The invention relates to an electromagnetic valve having a closure member which is movable to and fro between first and second positions, an electrically energizeable and deenergizable actuator for moving the closure member against a spring force from the first into the second position, and energizable and deenergizable retaining means which retain the closure member in the second position while both the actuator and the retaining means are deenergized.

BACKGROUND OF THE INVENTION

An electromagnetic valve is known from U.S. Pat. No. 4,678,000 in which the closure member can be moved by means of an electromagnetic actuator against a spring force into a closed position. The closure member is retained in this position by retaining means which come into frictional contact with the closure member. In the known prior art these retaining means are formed by annular piezoelectric elements.

However, these retaining means have the disadvantage that electrical power is necessary continuously in order to clamp the closure member firmly in the closed position.

A bistable electromagnetic setting system disclosed in DE-A-43 26 838 has an armature which can be returned by spring force is put into mechanical operative connection with a locking mechanism which can be alternately unlatched and latched by overdeviation, wherein in the latched state of the locking mechanism the armature is prevented from returning to its starting position. This principle which operates in the manner of a ball-point pen is, however, relatively complex.

The object of the invention, therefore, is to make further developments to the valve in such a way that the retaining means require no supply of power in either setting position of the closure member and are of simple construction.

SUMMARY OF THE INVENTION

According to the invention this object is achieved by the provision of retaining means formed by a piezoelectric bending element which locks the closure member positively in the second setting position.

THE DRAWINGS

FIG. 1 shows a schematic sectional representation of the valve according to the invention, FIG. 2 shows a schematic sectional representation along the line II—II in FIG. 1, FIG. 3 shows a signal pattern for the control of the bending element and the actuator according to a first embodiment, FIG. 4 shows a signal pattern for the control of the bending element and actuator according to a second embodiment, FIG. 5 shows a signal pattern for the control of the bending element and actuator according to a third embodiment, and FIG. 6 shows a signal pattern for the control of the bending element and actuator according to a fourth embodiment.

DETAILED DESCRIPTION

FIG. 1 shows a valve 1 having a closure member 2 which is movable to and fro along a first path between a first and a second setting position and an electrically controllable actuator 3 for moving the closure member against the force of a biasing spring 6 from the first into the second setting position.

In the illustrated second setting position a nozzle orifice or passage 8a extending through the housing of the valve 1 is opened, whilst in the first setting position the closure member 2 comes into contact with a valve seat 8b and closes the nozzle orifice 8a.

The electrically controllable actuator 3 is here constructed as an energizable and deenergizable electromagnetic unit of conventional kind having a coil, whilst a part of the closure member 2 provides an armature 2a which is linearly reciprocable in the direction of the double arrow 5 by energization and deenergization of the coil. The spring 6 is supported on the one hand on an abutment 7 and on the other hand on a circumferential flange 2b on the closure member 2.

A sealing element 2c is applied to the end of the closure member 2 facing the valve seat 8b. The spring 6 is pretensioned in such a way that the closure member 2 is biased into its first position, i.e. into its closed position, in which it rests with its sealing element 2c on the valve seat 8b.

By excitation of the actuator 3 the closure member 2 is moved against the force of the spring 6 into the illustrated second setting position.

In order to keep the closure member 2 in this second setting position, the actuator 3 would have to have current supplied continuously. In order to be able to avoid this, electrically operable retaining means are provided which are formed by an energizable and deenergizable piezoelectric bending element 4. This bending element 4 is controllable in such a way that it locks the closure member positively in the second setting position.

The bending element 4 is principally movable to and fro along a second path between a locking position represented in FIGS. 1 and 2 of the drawings by solid lines and a releasing position shown by broken lines.

The path of movement of the retaining element 4 is substantially normal to that of the closure member 2.

The co-operation of the bending element 4 and the closure member 2 is particularly clear from FIG. 2. The bending element 4 is gripped at one end in a bearing 9 to whereas its opposite end is free and moves energizing the illustrated manner when an voltage is applied. The bending element is thereby bent and its free end moves along a path essentially at right angles to the direction of movement (double arrow 5) of the closure member 2, so that it comes into contact with the closure member 2 when the latter is no longer retained by the actuator 3 and is pushed by its spring 6 to an intermediate position between the open and the closed position. The bending element 4 then blocks the path of the closure member and comes into positively locking contact therewith. In this case the bending element is clamped between the closure member 2 and a stationary abutment, for example the valve housing.

Finally, however, it is not a matter of whether the bending element in its rest position is located beside or below the closure member 2. Both variants are possible by corresponding control of the actuator 3 or of the bending element 4.

With the aid of FIGS. 3 to 6 different possible ways of controlling the actuator 3 and the bending element 4, and in these drawings the signal pattern of the actuator 3 is identified by the reference numeral 30 and the signal pattern of the bending element 4 by the reference numeral 40.

FIG. 3 describes a means of control in which the bending actuator 4 in its rest position is located beside the closure member 2. At a time to the closure member 2 is located in its first setting position, i.e. on the valve seat 8b. In order to move the closure member 2 from the first into the second setting position, the actuator 3 is actuated at a time $t_1$ so that the closure member 2 is retracted against the force of the spring 6. Simultaneously the bending element 4 also receives a control impetus, as a result of which the bending element 4 bends. The bending element 4 initially lies against the lateral wall of the circumferential flange 2b of the closure member 2, and then slides under the closure member 2 as soon as the latter is retracted to a sufficient extent. At a time $t_2$ the actuator is then no longer loaded, so that the closure member is pushed back into the intermediate position by the force of the spring 6. In this case the closure member comes into positive locking contact with the bending element on the underside of the circumferential flange 2b. Afterwards at a time $t_3$ the control of the bending element is disconnected. The bending element is clamped by the closure member 2 without the supply of energy.

In order to bring the closure member 2 back from this intermediate position into the first position, it is merely necessary to activate the actuator 3 briefly so that the closure member is briefly raised from the intermediate position. As a result the contact between the bending element 4 and the closure member 2 is broken and the bending element 4 returns automatically from the locking position into the releasing position. If the activation of the actuator 3 is then halted at a time $t_5$ the closure member 2 moves due to the force of the spring 6 into its closed position on the valve seat 8b.

FIG. 4 shows a further control possibility, by which the closure member 2 can be brought into the closed position. In this variant it is not the actuator 3 but the bending element 4 which is actuated at the time $t_4$, so that the bending element can be displaced laterally into the releasing position against the frictional forces caused by the closure member 2. The frictional forces to be overcome in this case can be adapted by the angles of contact between the bending element 4 and the closure member 2 as well as the line of action of force of the spring 6.

In the solution according to FIG. 3 it is merely necessary to have a bending element which makes a sufficient adjustment path available. A positioning force is not necessary in this case. In the solution according to FIG. 4, on the other hand, the actuator must additionally make a sufficient positioning force available in order to overcome the frictional forces brought about by the closure member 2.

In FIGS. 5 and 6 signal patterns are shown which relate to a bending element 4 which has its rest position below the closure member 2, i.e. in the locking position.

In FIG. 5 the closure member 2 is located at the time $t_0$ in its second position, in which it is locked by the bending element 4. By control of the actuator 3 at the time $t_1$ the closure member 2 is raised slightly so that by simultaneous activation of the bending element 4 the latter is deflected and pushed into its releasing position. As the actuator 3 is deactivated at a time $t_2$ and the bending element 4 is deactivated at a later time $t_3$, the closure member passes into its closed position on the valve seat 8b. In this case the bending element 4 rests on the lateral wall of the circumferential flange 2b of the closure member 2.

In order to open the nozzle orifice 8a it is merely necessary to activate the actuator 3 at a time $t_4$, so that the closure member 2 is pushed upwards. As soon as the closure member 2 has been pushed back to a sufficient extent, the bending element 4 slides automatically under the closure member 2, so that after deactivation of the actuator 3 at a time $t_5$ the closure member 2 comes into positive locking contact with the bending element 4.

In the means of control according to FIG. 6, at the time to the closure member is again located in the second position in which it is locked by the bending element 4. By control of the bending element 4 over the time period $t_1$ to $t_2$ a sufficient positioning force is produced which displaces the bending element laterally against the frictional force caused by the closure member 2, so that the closure member 2 is is released and is moved by the spring 6 into its closed position. After deactivation of the bending element this latter again rests on the lateral wall of the circumferential flange 2b of the closure member. In order to open the nozzle orifice 8a, the actuator 3 is activated for a time period between $t_3$ and $t_4$. As a result the closure member is raised from its valve seat 8b until the bending element 4 goes back automatically into its rest position below the closure member 2. After deactivation of the actuator 3 the closure member 2 sits on the bending element 4 and is locked thereby.

Precisely the last example shows a particularly simple type of control, since for a setting movement of the closure member only the actuator 3 or the bending element 4 has to be controlled. In the case of actuation of the bending element 4 the closure member passes from its open position into its closed position, and in the case of actuation of the actuator 3 it passes from its closed position into the open position.

The means of control according to FIG. 5 has the advantage that the bending element can be moved without force, whilst in the means of control according to FIG. 6 the bending element must additionally overcome the frictional force caused by the closure member 3. For this, in the control means according to FIG. 6, it is merely necessary to actuate the bending element 4 in order to bring the closure member into the closed position.

In all the embodiments electrical power is only necessary for displacing the closure member. As soon as the closure member is located in one of the two setting positions, it is retained in that position without further supply of power.

The piezoelectric bending element as retaining means is distinguished by a very simple and compact construction as well as a simple possibility for control.

We claim:

1. An electromagnetic valve construction comprising a housing having a fluid passage therethrough; a closure member reciprocable along a path between first and second positions in one of which said passage is open and in the other of which said closure member closes said passage; biasing means acting on said closure member and biasing said closure member to one of said positions; energizable and deenergizable electromagnetic actuating means operable in response to energization thereof to overcome said biasing means and effect movement of said closure member along said path from one of said positions to the other of said positions; and electrically energizable and deenergizable retaining means movable in response to energization and deenergization thereof between two positions in one of which said retaining means disables movement of said closure member in one direction along said path and in the other of which said closure member is able to move in said one direction along said path, said retaining means being operable in one of said positions to maintain said closure member in said other of said positions following deenergization of each of said actuating means and said retaining means.

2. The construction according to claim 1 wherein said closure member when in said other of said positions acts on said retaining means and maintains said retaining means in said one of said positions.

3. The construction according to claim 1 wherein said retaining means comprises a piezoelectric bending member having a portion thereof movable between positions in response to energization and deenergization of said bending member.

4. The construction according to claim 1 wherein said path of said closure member is linear and wherein said retaining means is movable between said two positions along a second path substantially normal to the path of movement of said closure member.

5. The construction according to claim 1 wherein said passage is open when said closure member is in its said second position.

6. The construction according to claim 1 wherein said passage is closed when said closure member is in its said second position.

7. The construction according to claim 1 wherein when said retaining means is in said one of said positions said retaining means lies between said closure member and said housing.

8. The construction according to claim 7 wherein said retaining means is frictionally maintained in said one of said positions.

9. The construction according to claim 8 wherein said retaining means when deenergized returns automatically to its said one position in response to energization of said actuating means and movement of said closure member toward said other position.

10. The construction according to claim 1 wherein said retaining means when deenergized is in its said one position.

11. An electromagnetic valve construction comprising a housing having a fluid passage therethrough; a closure member reciprocable along a path between first and second positions in one of which said passage is open and in the other of which said closure member closes said passage; biasing means biasing said closure member to one of said positions; energizable and deenergizable electromagnetic actuating means operable in response to energization thereof to overcome said biasing means and effect movement of said closure member from said one of said positions to the other; and electrically energizable and deenergizable retaining means movable in response to energization thereof from a first position to an adjusted position following movement of said closure member from said one of said positions toward the other, said retaining member when in said adjusted position preventing return movement of said closure member to said one of said positions, said closure member when in said other of said positions acting on said retaining means when the latter is in said adjusted position and maintaining said retaining means in said adjusted position regardless of whether said retaining means is energized.

12. The construction according to claim 11 wherein said retaining means comprises a piezoelectric arm fixed at one end and free at its other end, said other end of said arm being movable between said first and said adjusted positions in response to energization and deenergization of said arm.

13. The construction according to claim 12 wherein said path of said closure member is linear and wherein the free end of said retaining member is movable along a second path substantially normal to the path of movement of said closure member.

14. The construction according to claim 11 wherein said closure member occupies an intermediate position between said first and second positions when said actuating means is deenergized and said retaining means prevents return movement of said closure member to said one position, said closure member being movable from said intermediate position toward said second position in response to energization of said actuating means when said closure member is in said intermediate position.

15. The construction according to claim 14 wherein said closure member engages said retaining means when said closure member is in said intermediate position.

16. The construction according to claim 15 wherein energization of said actuating means when said closure member is in said intermediate position and consequent movement of said closure member toward said second position effects disengagement of said closure member and said retaining means.

17. The construction according to claim 16 wherein disengagement of said closure member and said retaining means enables said retaining means automatically to return to its said first position from its said adjusted position.

\* \* \* \* \*

UNITED STATES PATENT AND TRADEMARK OFFICE
CERTIFICATE OF CORRECTION

PATENT NO. : 6,047,945
DATED : April 11, 2000
INVENTOR(S) : Horst Grove et al

It is certified that error appears in the above-identified patent and that said Letters Patent is hereby corrected as shown below:

On the title page, please delete Item [57] and insert as follows:

--ABSTRACT
The invention relates to an electromagnetic valve having a passage therethrough and a closure member which is reciprocable between first and second positions in which the passage is opened and closed. An electromagnetic controllable actuator effects movement of the closure member against a spring force from the first position into the second position. The valve includes a retainer which retains the closure member in the second position. The retainer is formed by a piezoelectric bending element which locks the closure member positively in the second position.--

Figure 1:
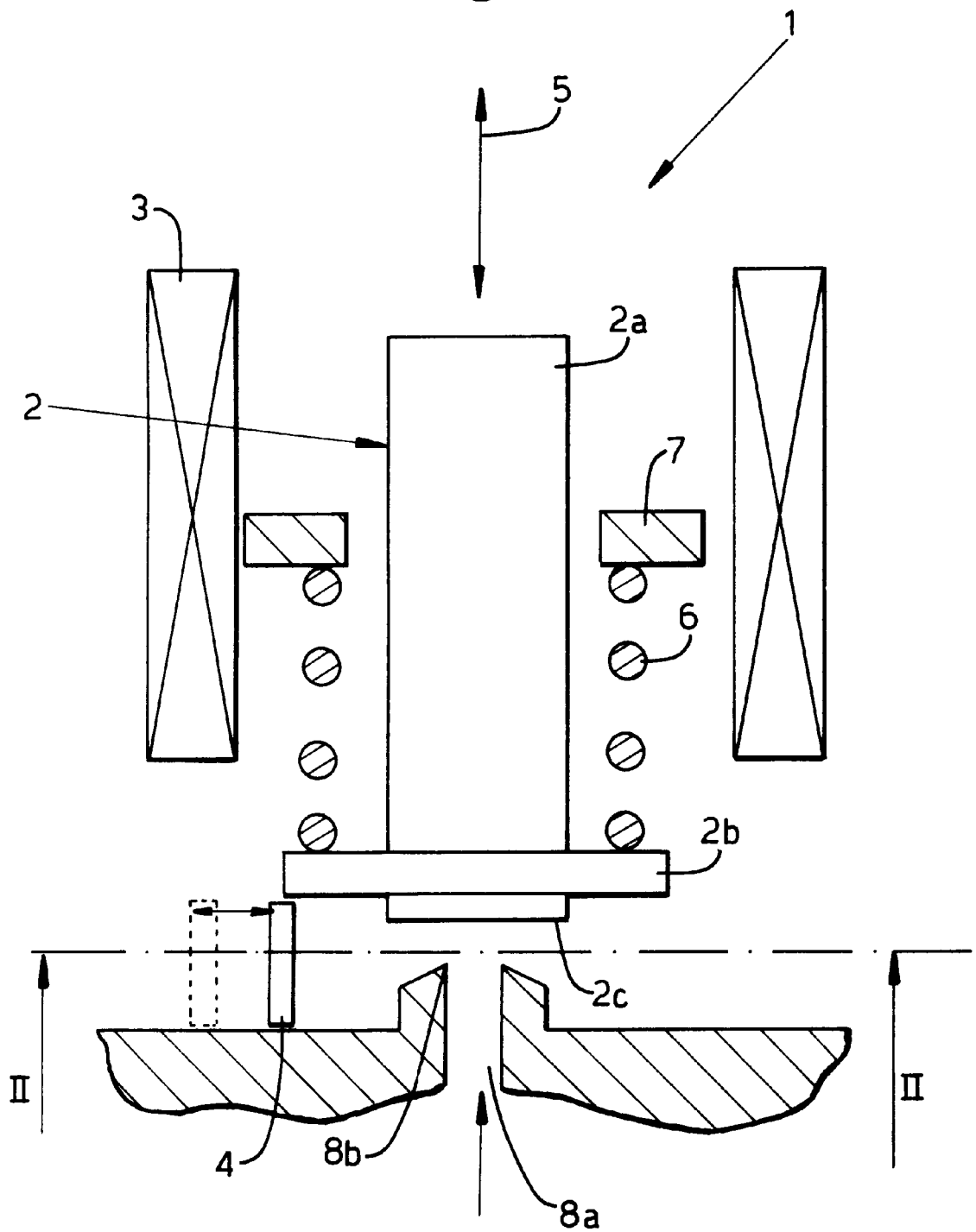
Figure 2:
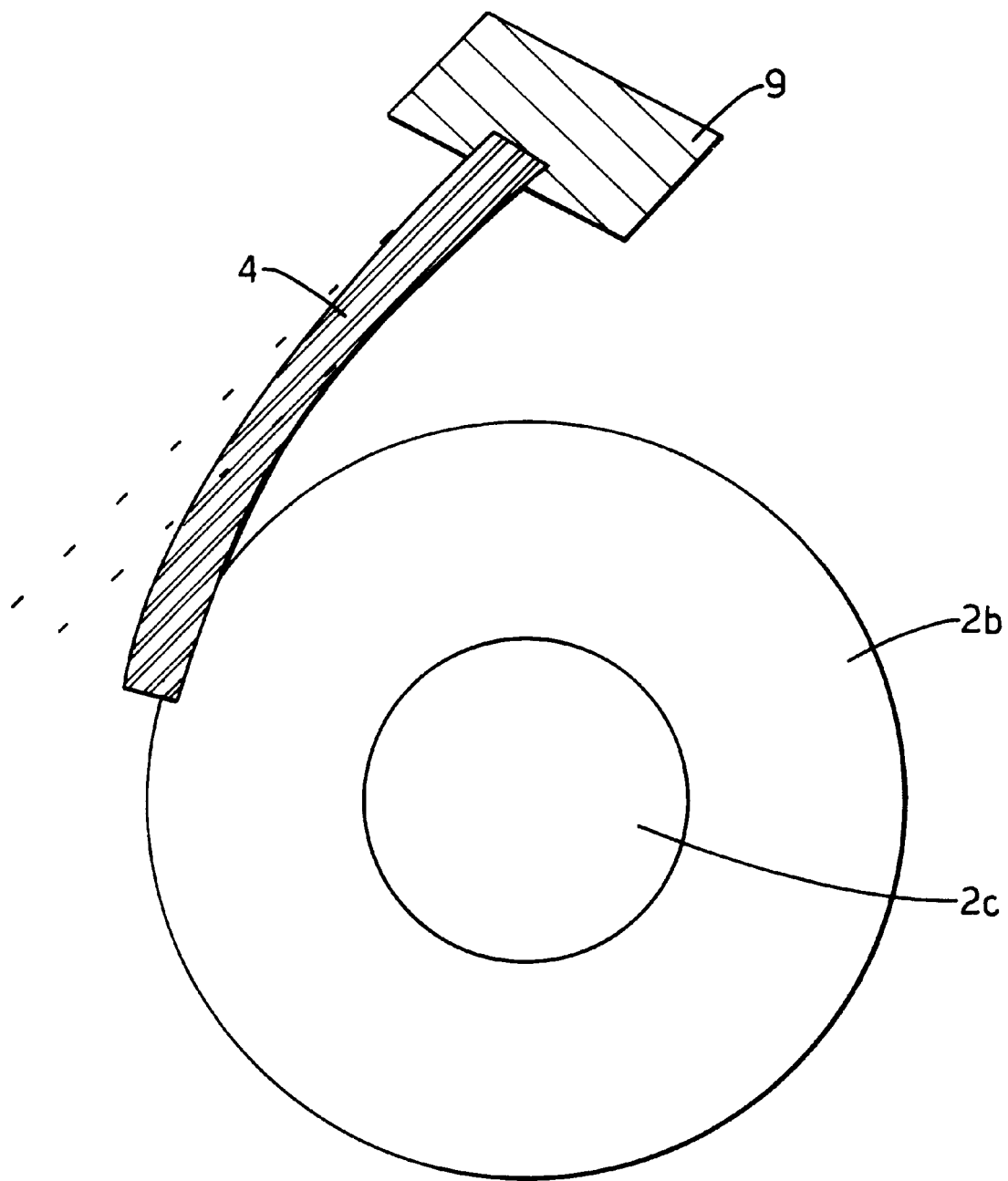
Figure 3:
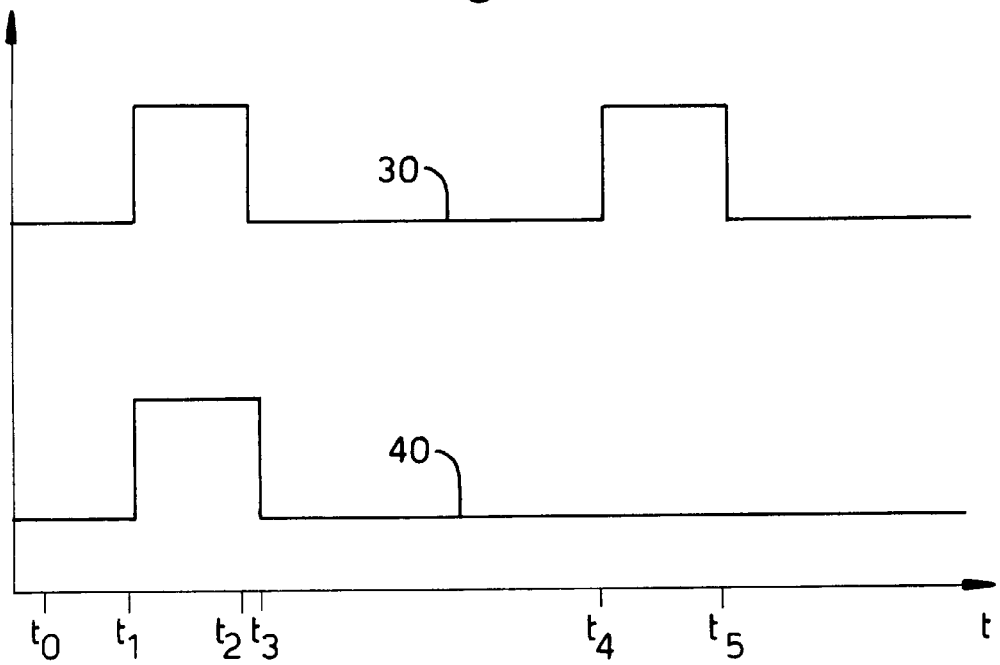
Figure 4:
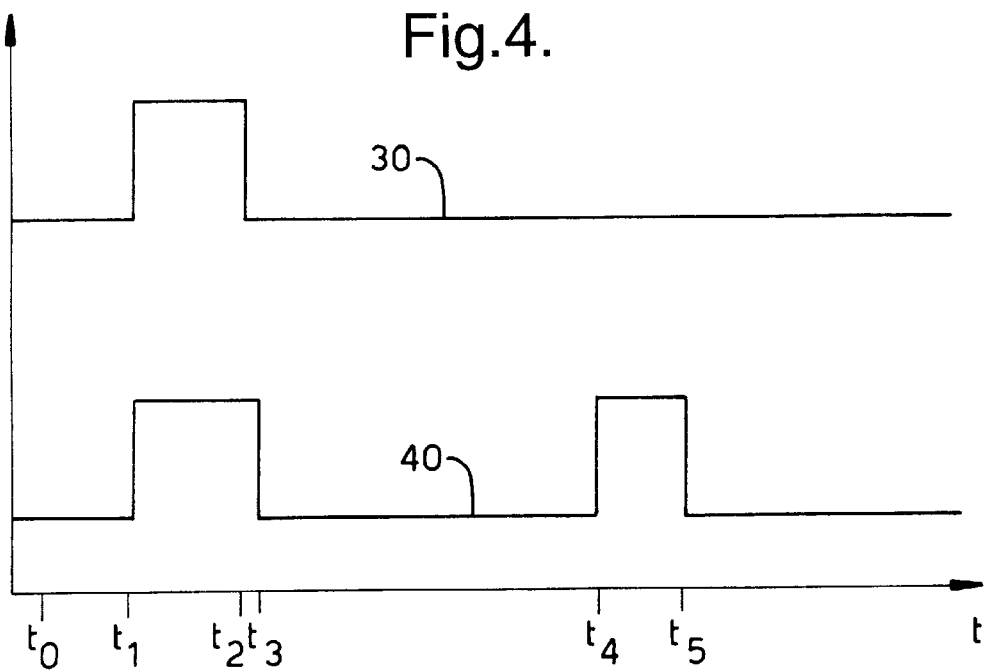
Figure 5:
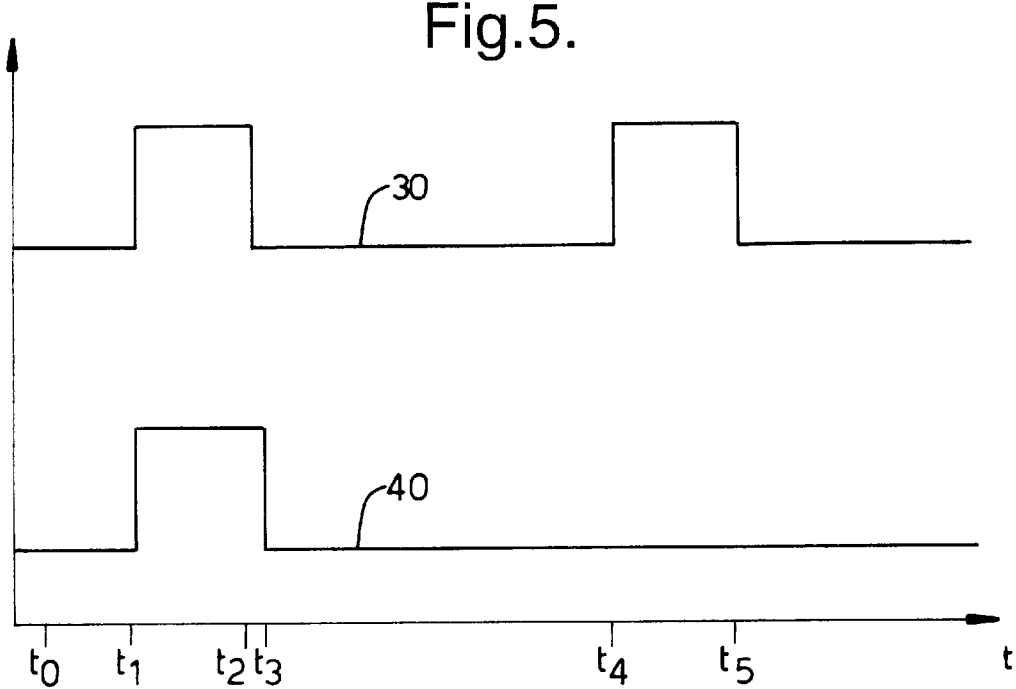
Figure 6:
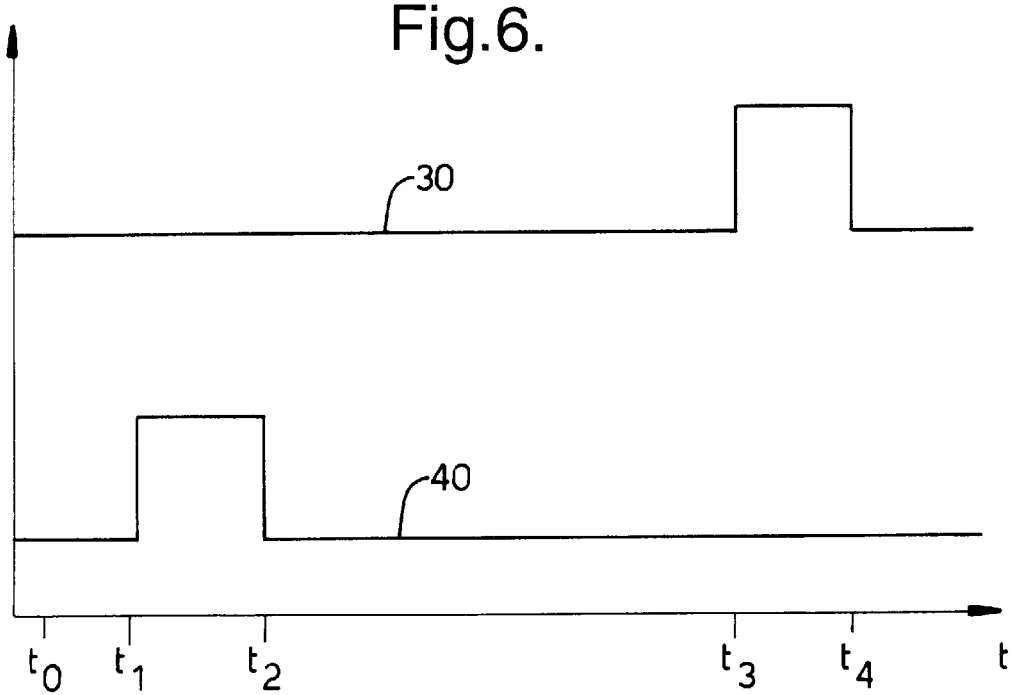

Column 4, line 4, change "to" to -- $t_0$ --. (2nd occur.)

Signed and Sealed this

Thirteenth Day of February, 2001

Attest:

NICHOLAS P. GODICI

Attesting Officer

Acting Director of the United States Patent and Trademark Office